Nov. 8, 1966  R. R. GRUNDTNER  3,283,535
SHAFT COUPLING

Filed Aug. 24, 1964  4 Sheets-Sheet 1

FIG. I

INVENTOR.
ROBERT R. GRUNDTNER
BY
*M A Hobbs*
ATTORNEY

INVENTOR.
ROBERT R. GRUNDTNER
BY *M A Hobbs*
ATTORNEY

Nov. 8, 1966

R. R. GRUNDTNER 3,283,535

SHAFT COUPLING

Filed Aug. 24, 1964

INVENTOR.
ROBERT R. GRUNDTNER
BY M. A. Hobbs
ATTORNEY

Nov. 8, 1966 R. R. GRUNDTNER 3,283,535
SHAFT COUPLING

Filed Aug. 24, 1964 4 Sheets-Sheet 4

INVENTOR.
ROBERT R. GRUNDTNER
BY M. A. Hobbs
ATTORNEY

# United States Patent Office 3,283,535
Patented Nov. 8, 1966

3,283,535
SHAFT COUPLING
Robert R. Grundtner, South Bend, Ind., assignor to Dodge Manufacturing Corporation, Mishawaka, Ind., a corporation of Indiana
Filed Aug. 24, 1964, Ser. No. 391,675
9 Claims. (Cl. 64—11)

The present invention relates to couplings, and more particularly to flexible couplings for connecting rotatable shafts in end-to-end relation.

In installations involving a driving mechanism such as an electrical motor and a driven mechanism, rotatable shafts of the two mechanisms are often placed in an end-to-end operating relation and connected by a flexible coupling which permits slight misalignment of the shafts and minimizes the transfer of vibration through the shafts from one mechanism to the other. The driving and driven mechanisms are often firmly mounted on and anchored to a base and are frequently large and heavy, and hence difficult to move or shift on their bases. In some equipment the shaft is moved endwise toward the other shaft when the equipment is serviced, and in the past it has been necessary to loosen the anchor bolts and shift either the driving or driven mechanisms in order to separate the ends of the shafts sufficiently to permit the aforesaid shaft to be adjusted. This is not only difficult and time-consuming, but it is frequently costly and entails a substantial amount of down-time of the equipment. It is therefore one of the principal objects of the invention to provide a flexible coupling, so constructed and designed that it can readily be assembled on the ends of the two shafts spaced to permit endwise adjustment of one of the shafts, without moving the equipment or the other shaft from their normal operating positions.

Another object of the present invention is to provide a flexible coupling which can easily be assembled onto two axially disposed shafts with substantial spacing between the ends thereof and which will operate efficiently using a relatively small flexible element between the opposed flanges on the shafts.

Still another object of the invention is to provide a relatively simple and compact flexible coupling which is adapted to span a relatively wide space between the ends of two axially aligned shafts and which firmly retains a torsion element between the two flanges in such a position as to obtain optimum operating conditions.

A further object of the invention is to provide a flexible coupling having only a few relatively simple parts which can be assembled separately onto the ends of a pair of shafts disposed in end-to-end relation and readily connected to one another in operative relation by a number of easily accessible screws, and which are retained firmly together by a series of screws equally spaced from one another and from the center of the shaft on which the coupling is mounted.

Another object is to provide a flexible coupling for connecting two spaced axially aligned shafts, which can readily be fabricated on conventional machines and which can be easily installed and serviced using standard tools or equipment.

Another object of the invention is to provide a coupling for connecting two axially aligned shafts, consisting of opposed flanges for the driving and driven shafts and a torsion element with a supporting structure adapted to be connected to the two flanges after the flanges have been mounted on the shafts.

The present invention incorporates a series of annular members consisting of opposed flanges for mounting on two axially aligned shafts the ends of which are spaced relatively far apart, two sets of intermediate and inner rings secured to the respective flanges and secured to one another by a plurality of screws, bolts or the like, equally spaced from one another and from the center of the shaft, and a torsion element spanning the space between the two inner rings and being clamped at its inner edges between the respective intermediate and inner rings. The assembly consisting of the flexible torsion element and the intermediate and inner rings may be handled as a separate unit for assembling and disassembling the coupling in any particular installation.

The invention may be more fully understood by referring to the following description and accompanying drawings, wherein.

Figure 1:
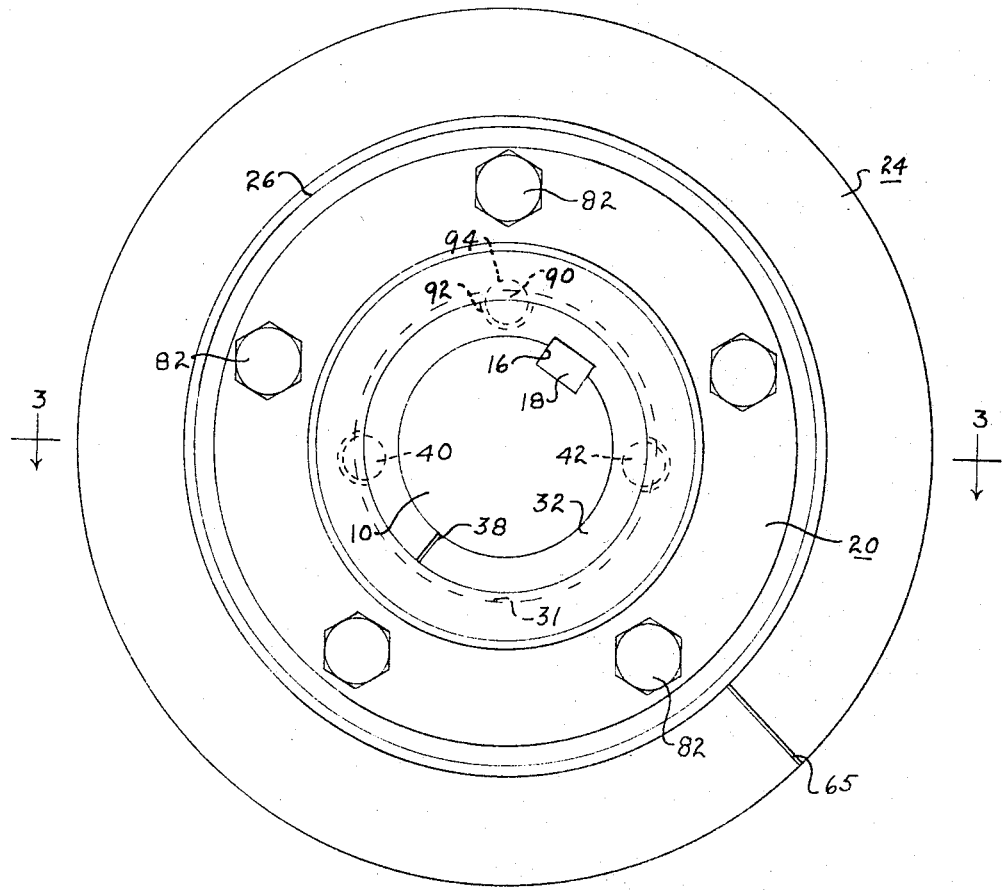
FIGURE 1 is an end elevational view of a flexible coupling embodying my invention.
Figure 2:
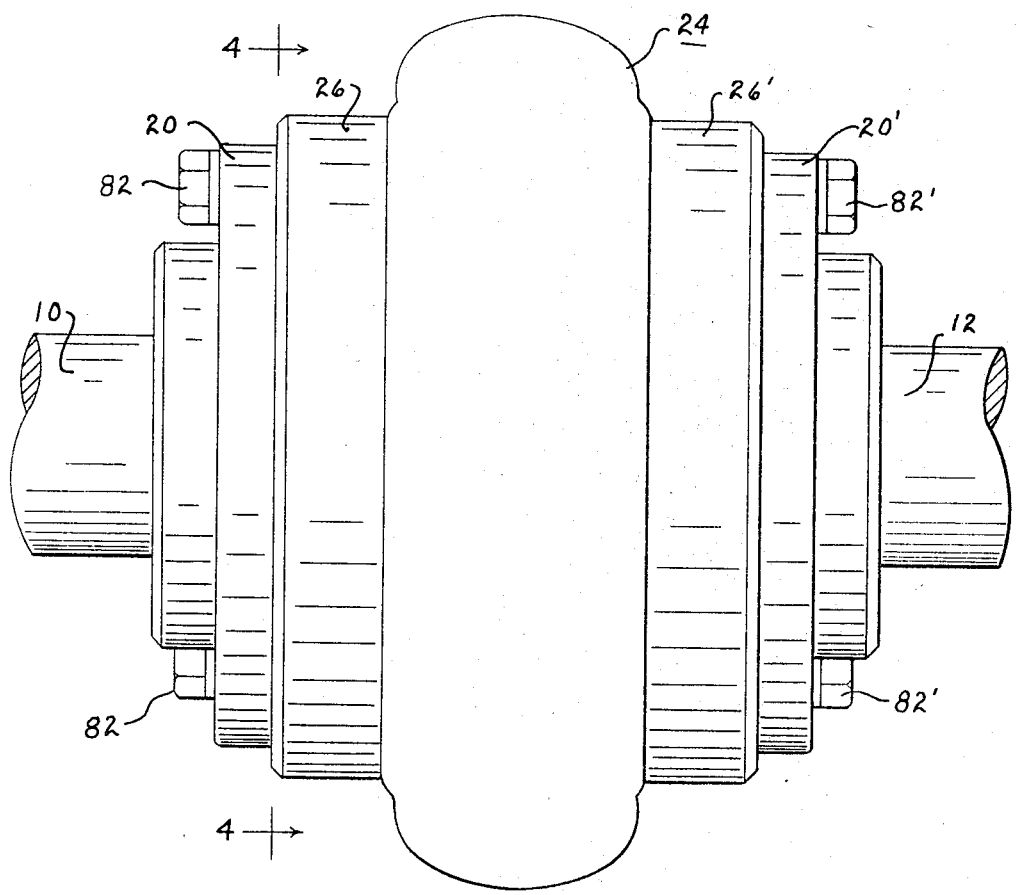
FIGURE 2 is a side elevational view of the coupling shown in FIGURE 1.
Figure 3:
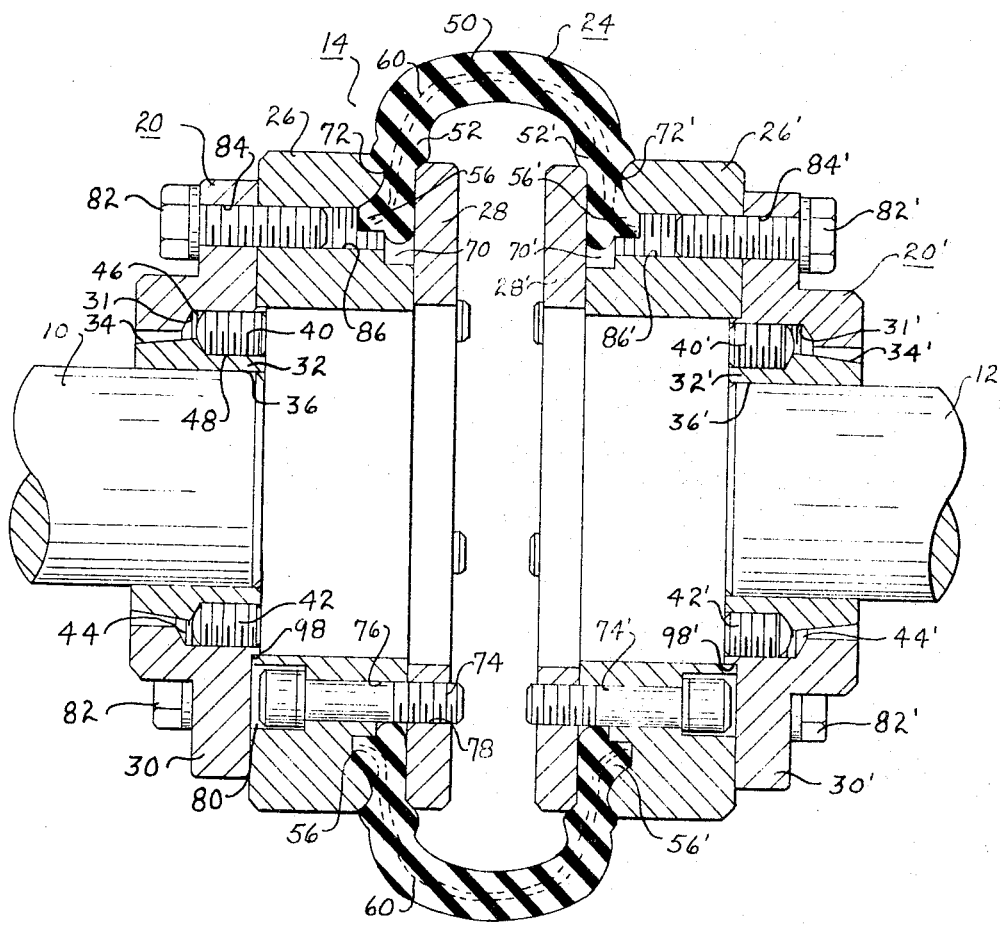
Figure 4:
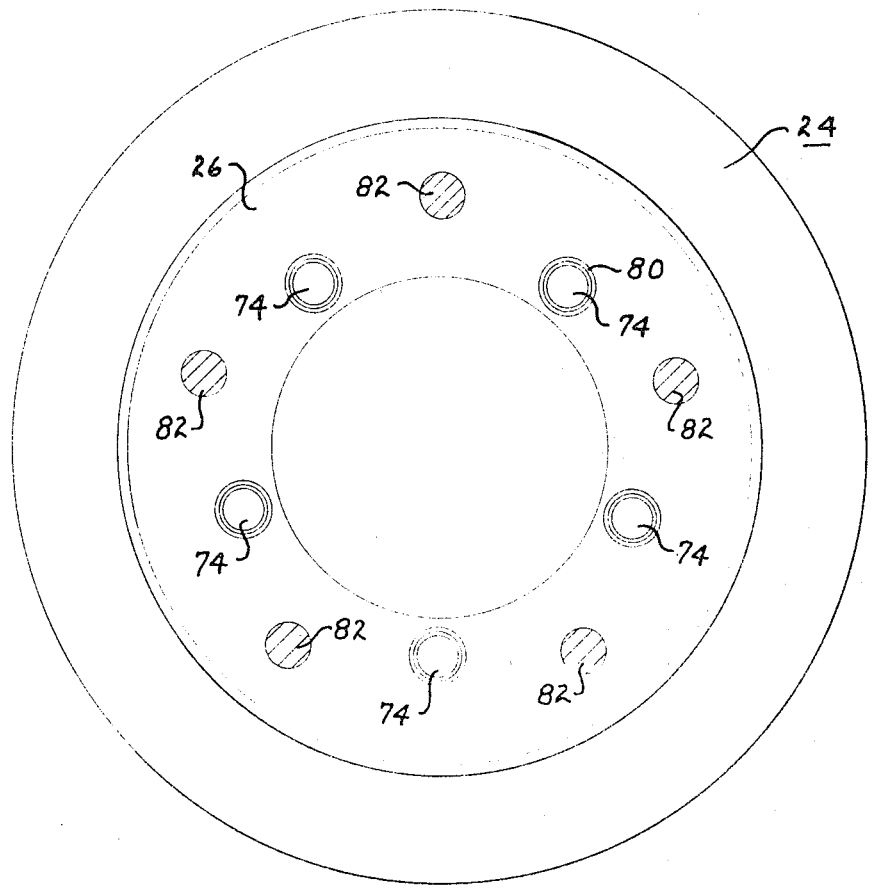

FIGURE 3 is a longitudinal cross sectional view of the present coupling taken on line 3—3 of FIGURE 1 and showing the various annular and axially arranged parts, assembled and held in normal operating position; and FIGURE 4 is an end view of a subassembly and partial cross sectional view of the coupling shown in the preceding figures, the elevational and sectional view of the subassembly being indicated by lines 4—4 of FIGURE 2.

Referring more specifically to the drawings, numerals 10 and 12 designate the driving and driven shafts, respectively, and numeral 14 designates the flexible coupling secured to the opposed ends of shafts 10 and 12. The driving shaft 10 may be, for example, the shaft of an electric motor, internal combustion engine or the like, and the driven shaft may be the power output shaft of a number of different types of industrial, commercial, farm and domestic equipment. The shafts 10 and 12 illustrated in the drawings are shown as being of the same diameter, with keyways 16 and shaft-keys 18 and the ends of the shafts being spaced a substantial distance apart in order to permit the shaft of the driven equipment, for example, to be shifted endwise toward shaft 10 in order to make an adjustment in the driven equipment. The distance between the ends of the two shafts may be varied from one installation to the other without changing the design or construction of the coupling.

The present flexible coupling consists principally of flanges 20 and 20' for the driving and driven shafts 10 and 12, and a flexible torsion member assembly 24 secured to flanges 20 and 20' by intermediate and inner rings 26, 26' and 28 and 28'. The two flanges and corresponding rings are preferably identical in construction, and hence may be used interchangeably on the driving and driven shafts of the proper diameter; consequently, only one of the flanges and corresponding rings will be described in detail herein and like numerals will be used on like parts of those flanges and rings, with primes being used with the numerals of the other like parts.

The flange 20 consists of an annular member 30 with an internal bore having a tapered surface 31 decreasing in diameter from the inner side of the flange to the outer side, and inserted in the bore is a split bushing 32 having an external surface 34 tapered to correspond to the tapered surface 31 on the flange and having an internal annular surface 36 parallel with the shaft and defining a bore of substantially the same size as the shaft. The bushing is continuous throughout, with the exception of slot 38 of sufficient width to permit the bushing to contract during installation to grip the shaft firmly, and the tapered surfaces of the flange bore and bushing are assembled in face-to-face contact and are adapted to slide relative to one another as the flanges are assembled on and secured to the respective shafts, as will be more fully explained hereinafter.

The bushing 32 is contracted into firm engagement with the shaft on which the flange is mounted by two screws 40 and 42, each being seated in a bore 44, one longitudinal portion 46 of which is formed in the internal surface 31 of the flange and the other portion 48 of which is formed in the external surface 34 of bushing 32. Bore portion 46 is threaded throughout its length and is longer than bore portion 48, so that when screw 40 is threaded into bore 44, the end of the screw abuts against the inner end of portion 48, thereby forcing bushing 32 inwardly along tapered surface 31, causing bushing 32 to contract and firmly engage the shaft. Both screws 40 and 42 are tightened substantially the same amount and, when fully tightened, retain flange 20 firmly in place on the end of the shaft. Flange 20' is secured to shaft 12 in the same manner by screws 40' and 42' in corresponding bores 44'. While the foregoing flange securing means is preferred in attaching the coupling to axially disposed shafts, other types of suitable securing means may be used if desired.

The flexible torsion element 24 consists of an annular body portion 50 of arcuate cross section joined to inwardly extending side walls 52 and 52', which terminate at their inner edges in small outwardly extending ribs 56 and 56', respectively. The torsion member is preferably preformed to the general configuration shown in the drawings and is constructed of rubber or rubber-like synthetic material having a plurality of layers of fabric 60 of nylon cord or other suitable material embedded in body portion 50 and side walls 52 and 52'. While member 24 may be circumferentially continuous, it is preferably split as shown at slot 65, to facilitate assembling the member during the initial installation, and in the replacement of a new element for one worn beyond optimum service.

The flexible torsion element is supported on the two flanges 20 and 20' by intermediate rings 26 and 26' and inner rings 28 and 28'. The inner edge of intermediate ring 26 is provided with a groove 70 for receiving the inner edges of side walls 52 and 52' of torsion element 24, the wall of the groove having a rounded protruding portion 72 for concentrating the pressure thereof on sidewalls 52 and 52', at a point spaced outwardly from the inner edge of the side walls. The two side walls 52 and 52' are held firmly in grooves 70 and 70' and against protrusions 72 and 72' by inner rings 28 and 28' which are secured to intermediate rings 26 and 26' by five bolts 74, extending through holes 76 in the intermediate ring and threadedly received in holes 78 in the inner ring. The heads of the bolts are seated in a recess 80 so that the bolts when fully seated do not interfere with the assembly of intermediate ring 26 on the inner surface of flange 20. After the side walls of torsion element 24 have been firmly clamped between intermediate and inner rings 26 and 28 and 26' and 28' by bolts 74, a subassembly is formed which can be installed as an integral unit between the two flanges 20 and 20'.

The subassembly, consisting of the intermediate and inner rings and torsion element 24 secured together in the foregoing manner by bolts 74, is secured to flanges 20 and 20' by bolts 82 and 82', extending through holes 84 and 84' in flanges 20 and 20', and threadedly received in holes 86 and 86' in intermediate rings 26 and 26'. When bolts 74 and 74' and 82 and 82' have been tightened in place, the respective flange, intermediate ring and inner ring form a rigid integral unit supported by the respective shaft.

To facilitate removal of the flanges after the flexible element 24 and the subassembly consisting of the two intermediate and inner rings have been removed, a screw 90, having an arrangement of threaded and abutment portions the reverse of that in bores 44 and 44', is provided to unseat the bushing from the inner surface 31 of the flange. In this construction the threaded portion 92 of bore 94 is in the bushing, and the abutment is in the portion of the bore in flange member 20. When the screw is tightened it contacts the abutment and forces the flange member axially on the bushing, thus permitting the bushing to expand and be easily removed from the shaft.

In installing the present coupling on an opposed pair of shafts arranged in an end-to-end relation, the two flanges 20 and 20' with their respective bushings 32 and 32' are mounted on shafts 10 and 12. Upon tightening of screws 40 and 42 and 40' and 42', the bushings are contracted onto shafts 10 and 12 and forced into firm engagement with the tapered surfaces 31 and 31' of the two flanges. After the two flanges have been rigidly secured to the shafts, the sub-assembly, consisting of the two intermediate rings 26 and 26' and inner rings 28 and 28' and flexible element 24, is inserted between the two flanges in axial alignment therewith and secured rigidly in place by bolts 82 and 82' extending through the respective flanges into intermediate rings 26 and 26'. In the foregoing assembly operation, the edges of flexible element 24 are clamped between the intermediate and inner rings and held securely in this clamped position by bolts 74 and 74' extending through holes 76 and 76' in the intermediate rings and threadedly received in holes 78 of the inner rings. To facilitate accurate centering of the intermediate rings and the respective flanges, particularly during this assembling operation, annular shoulders 98 and 98' for receiving the inner edge of the intermediate rings, are provided on the inner faces of the two flanges 20 and 20'.

When it is necessary to make an adjustment in the equipment entailing the shifting of one of the shafts endwise towards the other shaft, the subassembly of the coupling, consisting of the two intermediate and inner rings and the flexible element, can be readily disassembled by removing bolts 82 and 82', leaving the two flanges secured to the shafts. With this subassembly removed, either one of the two shafts can be moved endwise without interference from the coupling parts.

While only one embodiment of the present invention has been described in detail herein, various changes and modifications may be made to satisfy requirements.

I claim:

1. A flexible coupling for connecting two shafts in end-to-end relation with the ends thereof spaced a substantial distance apart, comprising flanges for said shafts, each of said flanges having an annular shoulder on its internal face, means for securing said flanges to said shafts, an intermediate ring for each of said flanges seating on said annular shoulder and having an annular groove on its inner surface, a flexible element of arcuate cross section and with inwardly extending side walls seating in said grooves, an inner ring on each of said intermediate rings adjacent the grooves therein, screws extending through said intermediate and inner rings for clamping said side walls in said grooves, and screws extending through said flanges for securing said intermediate rings to the respective flange.

2. A flexible coupling for connecting two shafts in end-to-end relation with the ends thereof spaced a substantial distance apart, comprising flanges for said shafts, each of said flanges having an inner face, means for securing said flanges to said shafts, an intermediate ring mounted on the inner face of each flange and positioned axially with respect thereto, each of said rings having an annular groove on its inner surface, a flexible element of arcuate cross section and with inwardly extending side walls seating in said grooves, an inner ring on said of each intermediate rings adjacent the grooves therein, screws extending through said intermediate and inner rings for clamping said side walls in said grooves, and screws extending through said flanges for securing said intermediate rings to the respective flange.

3. A flexible coupling for connecting two shafts in end-to-end relation, comprising flanges for said shafts, each of said flanges having an inner face, means for securing said flanges to said shafts, an intermediate ring mounted on the inner face of each flange and positioned axially with respect thereto, a flexible element of arcuate cross section and with inwardly extending side walls, an inner ring on each of said intermediate rings in axial alignment therewith, screws extending through said intermediate and inner rings for clamping said side walls between said rings, and screws extending through said flanges for securing said intermediate rings to the respective flange.

4. A flexible coupling for connecting two shafts in end-to-end relation with the ends thereof spaced a substantial distance apart, comprising flanges for said shafts, each of said flanges having an annular shoulder on its internal face, means for securing said flanges to said shafts, an intermediate ring for each of said flanges seating on said annular shoulder, a flexible element with inwardly extending side walls, an inner ring on each of said intermediate rings in axial alignment therewith, means securing said intermediate and inner rings together to clamp said side walls thereto, and means for securing said intermediate rings to the respective flange.

5. A flexible coupling for connecting two shafts in end-to-end relation with the ends thereof spaced a substantial distance apart, comprising flanges for said shafts, each of said flanges having an inner face, means for securing said flanges to said shafts, an intermediate ring mounted on the inner face of each flange and positioned axially with respect thereto, a flexible element of arcuate cross section and with inwardly extending side walls, an inner ring on each of said intermediate rings in axial alignment therewith, means securing said intermediate and inner rings together to clamp said side walls thereto, and means for securing said intermediate rings to the respective flange.

6. A flexible coupling for connecting two shafts in end-to-end relation with the ends thereof spaced a substantial distance apart, comprising flanges for said shafts, each of said flanges having an inner face, means for securing said flanges to said shafts, an intermediate ring mounted on the inner face of each flange and positioned axially with respect thereto, a flexible element with inwardly extending side walls, and an inner ring on each of said intermediate rings in axial alignment therewith for clamping said side walls therebetween.

7. A flexible coupling for connecting two shafts in end-to-end relation with the ends thereof spaced a substantial distance apart, comprising flanges for said shafts, each flange having an annular flange member, a split bushing with an internal annular surface generally parallel with the axis of the shafts and an external surface tapered from the inside end to the outside end, said member having a bore for receiving said bushing and having an inner surface tapered to correspond to the tapered external surface of said bushing for face-to-face contact therewith, bores intersecting the tapered surfaces and having threads in the portion in said member and an abutment in the portion in said bushing, screws in said last mentioned bores, each of said flanges having an annular shoulder on its internal face, an intermediate ring for each of said flanges seating on said annular shoulder and having an annular groove on its inner surface, a flexible element of arcuate cross section and with inwardly extending side walls seating in said grooves, an inner ring on each of said intermediate rings adjacent the grooves therein, screws extending through said intermediate and inner rings for clamping said side walls, and screws extending through said flange members securing said intermediate rings to the respective flange.

8. A flexible coupling for connecting two shafts in end-to-end relation with the ends thereof spaced a substantial distance apart, comprising flanges for said shafts, each flange having an annular flange member, a split bushing with an internal annular surface generally parallel with the axis of the shafts and an external surface tapered from one end to the other, said member having a bore for receiving said bushing and having an inner surface tapered to correspond to the tapered external surface of said bushing for face-to-face contact therewith, bores intersecting the tapered surfaces and having threads in the portion in said member and an abutment in the portion in said bushing, screws in said last mentioned bores, an intermediate ring for each of said flanges, a flexible element of arcuate cross section and with inwardly extending side walls, an inner ring on each of said intermediate rings in axial alignment therewith, screws extending through said intermediate and inner rings for clamping said side walls, and screws extending through said flanges securing said intermediate rings to the respective flange.

9. A flexible coupling for connecting two shafts in end-to-end relation with the ends thereof spaced a substantial distance apart, comprising flanges for said shafts, each flange having an annular flange member, a split bushing with an internal annular surface generally parallel with the axis of the shafts and an external surface tapered from one end to the other, said member having a bore for receiving said bushing and having a surface tapered to correspond to the tapered external surface of said bushing for face-to-face contact therewith, bores intersecting the tapered surfaces and having threads in the portion in said member and an abutment in the portion in said bushing, screws in said last mentioned bores, an intermediate ring for each of said flanges, a flexible element with inwardly extending side walls, and an inner ring on each of said intermediate rings in axial alignment therewith for clamping said side walls therebetween.

References Cited by the Examiner

UNITED STATES PATENTS 3,024,628   3/1962   Yang _____ 64—11

FOREIGN PATENTS 1,248,272   10/1960   France.
484,834   5/1938   Great Britain.

FRED C. MATTERN, JR., *Primary Examiner.*

HALL C. COE, *Examiner.*